Jan. 14, 1964 L. B. EMERSON ETAL 3,118,142
SYNCHRONIZATION APPARATUS
Filed July 27, 1960 2 Sheets-Sheet 1
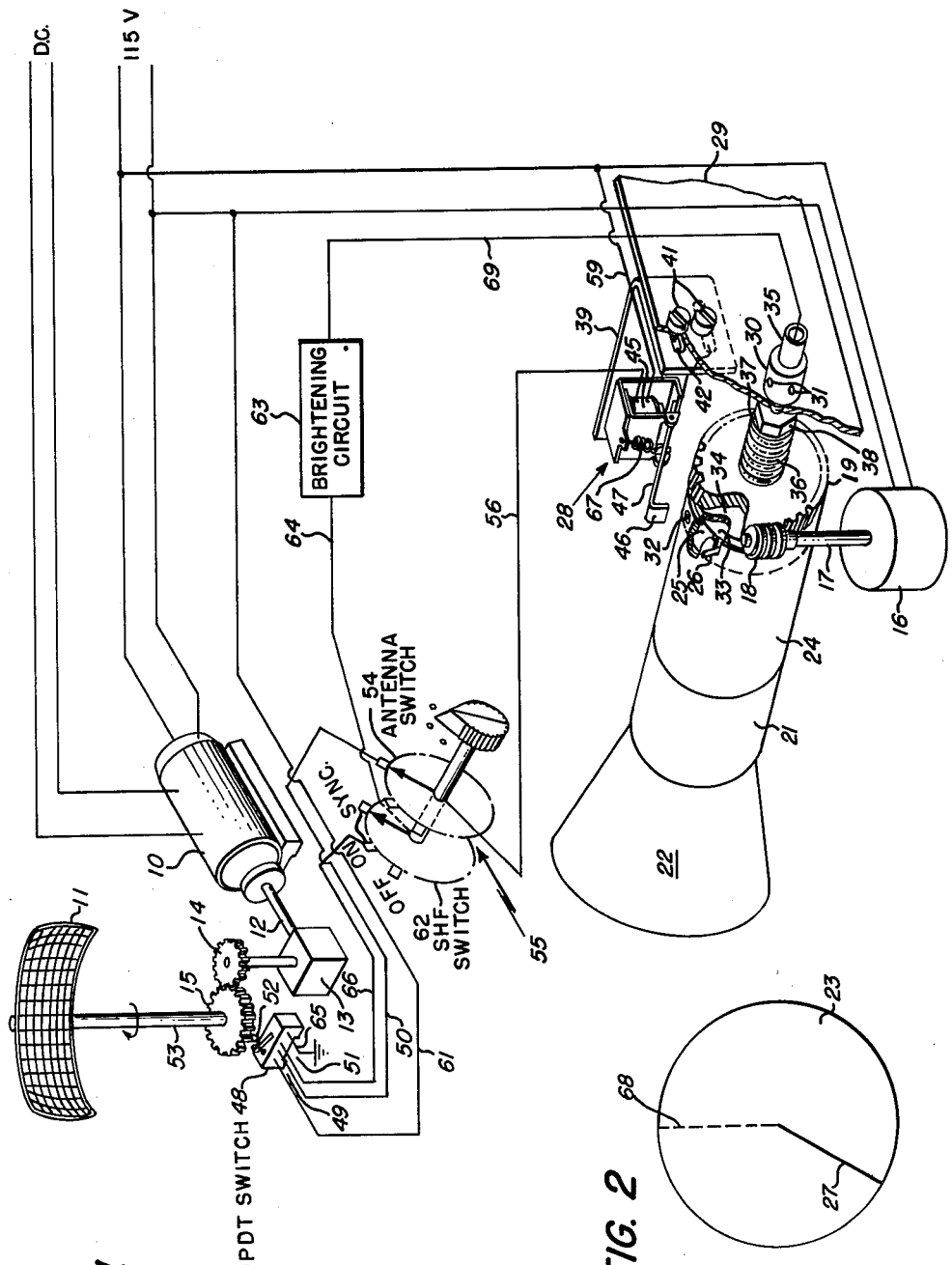
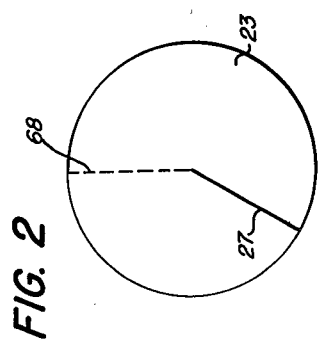
INVENTORS
LEONARD B. EMERSON
RICHARD HOLZMAN
BY Robert F. O'Connell
ATTORNEY

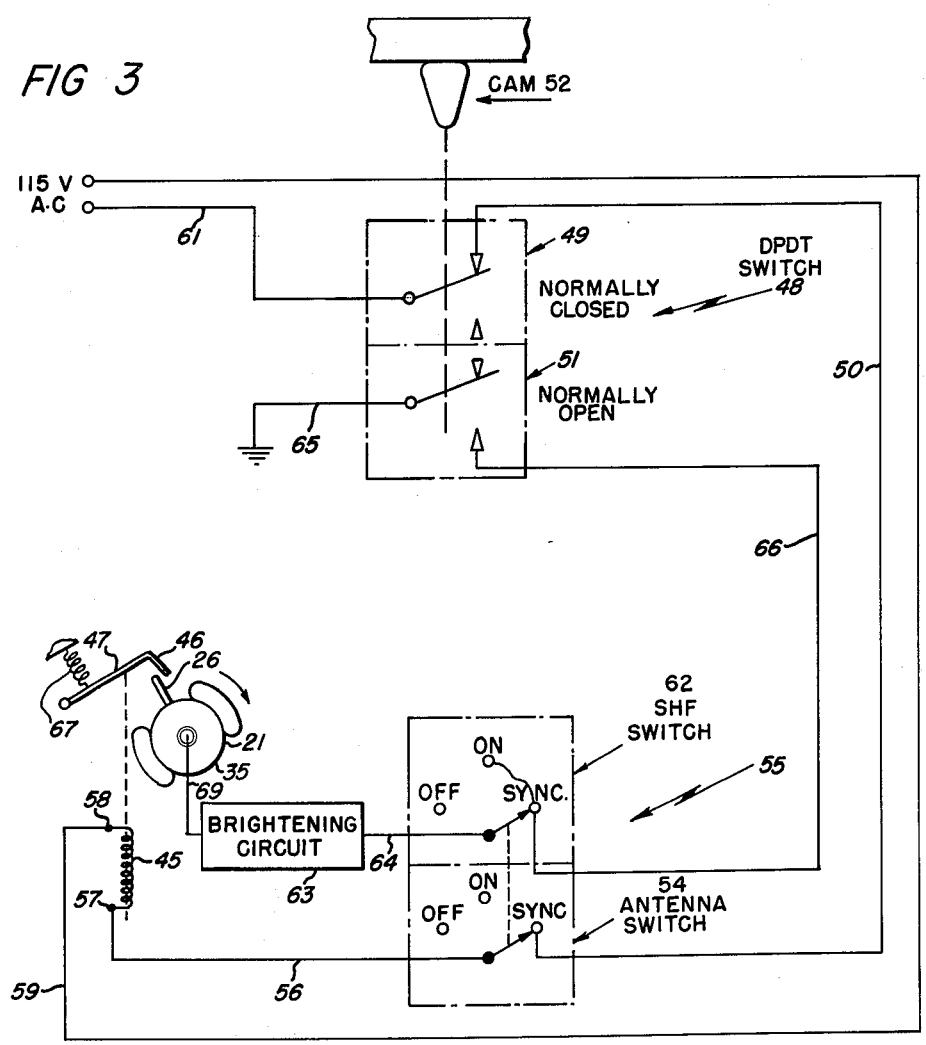

United States Patent Office 3,118,142
Patented Jan. 14, 1964

3,118,142
SYNCHRONIZATION APPARATUS
Leonard B. Emerson and Richard Holzman, Framingham, Mass., assignors to Raytheon Company, Lexington, Mass., a corporation of Delaware
Filed July 27, 1960, Ser. No. 45,741
10 Claims. (Cl. 343—118)

The present invention relates to synchronization apparatus and more particularly to simple and economical means for placing the sweep of a plan position indication radar display in azimuth or bearing synchronism with the antenna.

The antenna azimuth transmission and synchronization systems used in most radars are separate and self-contained systems involving synchros, gears, servo systems, complex electronic circuits and the like that account for a large part of production costs.

The present invention comprises an improvement in the antenna azimuth transmission system shown and described in patent application Serial No. 1929, filed January 12, 1960, now U.S. Letters Patent No. 3,091,766, which issued May 28, 1963, by Robert A. Fryklund to which reference is hereby made. In accordance with the system of Fryklund, a rotary inverter mounted in the antenna pedestal is utilized to supply A.C. (alternating current) power for the receiver and transmitter portions of a radar system and to concomitantly drive the antenna through gear speed reducer means. In this manner, the inverter functions not only as an electric power converter, but as the antenna drive motor as well. If the inverter has a rotational speed of, for example, 3600 r.p.m. (revolutions per minute) and supplies 115 volts at 60 cycles per second, a gear reduction of 180:1 may be used to rotate the antenna at 20 r.p.m. The A.C. power from the inverter is supplied to the balance of the radar installation in conventional manner and a small portion of this A.C. power is utilized to drive a synchronous motor, for example, of the instrument type having a rotational speed of 1800 r.p.m. Deflection means, such as a deflection coil rotatably mounted on a cathode ray tube for providing a PPI (plan position indication) sweep, is driven by the synchronous motor through gear speed reducer means and a mechanical differential with a manual control brought out to the front panel for positioning the SHF (ship's heading flasher). If the gear speed reducer means for the synchronous motor has a ratio of 90:1, the deflection coil will be driven at 20 revolutions per minute. Since the deflection coil of the display system will be in step with, but at some random angular position relative to, the antenna, the manual control is provided to correct the aforementioned random angle until the ship heading flasher is at zero degrees relative on the face of the cathode ray tube, which is to say the PPI sweep in azimuth or bearing is synchronized with the antenna.

In accordance with the present invention, the random angle which may exist between, for example, an antenna and deflection means is corrected (or, in other words, the PPI sweep is synchronized in azimuth with the antenna) by the provision of means controlled by antenna position being interposed between and coupling the deflection means and the driving means therefor, said controlled means being operable to stop or restrain rotation of the deflection means until the sweep is synchronized with the antenna, i.e., until a selected position of the deflection means corresponds to a selected position of the antenna.

It is therefore the principal object of the present invention to provide simple, inexpensive and dependable apparatus for placing the rotation of a PPI sweep in azimuth or bearing synchronism with an antenna.

Other objects and many of the attendant advantages of the present invention will be readily appreciated as the same becomes better understood by reference to the following detailed description when considered in conjunction with the drawings wherein:

FIG. 1 shows diagrammatically one embodiment of the invention,

FIG. 2 shows the face of the cathode ray tube shown in FIG. 1; and

FIG. 3 is a schematic representation of the invention.

With reference now to FIG. 1, there is shown a rotary inverter 10 driving a rotatable antenna 11 through a shaft 12 connected to the armature of the inverter 10, conventional gear speed reduction means 13, and a gear train comprised of gears 14 and 15. The rotary inverter 10 may be actuated by D.C. (direct current) from any suitable source (not shown) and supplies alternating current to the radar power supply and to synchronous motor 16. The rotary inverter 10 may, for example, be actuated by 32 volts D.C. and supply 115 volts at 60 cycles per second. If the rotary inverter 10 has a rotational speed of, for example, 3600 revolutions per minute and a gear reduction of 180:1 is provided by gear speed reduction means 13, the antenna 11 will be rotated through 360 degrees at 20 r.p.m.

The shaft 17 of the synchronous motor 16 is effectively terminated by a worm gear 18, which is in driving relationship with gear 19, which drives the deflection coil 21 rotatably carried on a cathode ray tube 22 for providing in conventional manner a PPI display on the face 23 of the cathode ray tube 22, as shown in FIG. 2. The combination of worm gear 18 and driving gear 19 provides speed reduction. A cylindrical sleeve 24 extending rearwardly past the end cap of the cathode ray tube (not shown) is fixedly attached to the deflection coil 21. A second sleeve 25, located within sleeve 24 and having an outwardly projecting stop pin 26, is adjustably attached to sleeve 24 as by set screw 32 to permit longitudinal adjustment of pin 26 so that the deflection coil 21 is stopped when the sweep 27 is at, for example, zero degrees relative bearing. Alternately, sleeve 25 may be omitted and the stop pin 26 mounted in sleeve 24. The extreme end of sleeve 25 is closed as by an end wall 33 having an axial passage to permit connection of conductors to the cathode ray tube terminals. Fixedly attached to the end wall 33 is a clutch disc 34 composed of, for example, cork. Gear 19 is rotatably carried on a hollow stationary shaft 35 and is maintained in abutting engagement with the clutch disc 34 by compression spring 36, thrust washer 37, and pressure adjust nut 38. Adjustment of pressure adjust nut 38 permits adjustment of the point at which gear 19 will slip. Shaft 35 passes through support 29 and is locked in position by means of collar 30 and set screws 31 carried on shaft 35.

Relay 28 is supported in spaced relationship with pin 26 such that when coil 45 is energized in the manner hereinafter described, the end portion 46 of arm 47 engages pin 26, thereby stopping or restraining rotation of the deflection coil 21 at a predetermined or selected position and causing gear 19 to slip with relation to the deflection coil 21. Relay 28 may be adjustably attached to bracket 39 as by a bolt passing through an elongate and vertically disposed slot (not shown) in bracket 39 and threadably engaging the relay. Bracket 39 is attached to support 29 by means of bolts 41 which pass through support 29 and slots 42 in bracket 39 and permit transverse adjustment of bracket 39.

A DPDT (double pole, double throw) switch 48 having a normally closed portion 49 and a normally open portion 51 is actuated when the antenna 11 has a predetermined or selected orientation such as, for example, alignment with a ship's keel. Switch 48 is shown, by way of example, as being actuated by a cam 52 on gear 15 fixedly attached to the antenna shaft 53 and driven by the rotary inverter 10. Obviously, switch 48 can be suitably located or actuated in any number of different ways so long as it is actuated when the antenna has the desired predetermined orientation. One side of the normally closed portion 49 is connected in series via conductor 50 with a switch or preferably one portion 54 of a manual ganged rotary switch 55 which, in turn, is connected in series via conductor 56 with one terminal of coil 45, the other terminal of coil 45 being connected via conductor 59 to one terminal of a suitable source of power, the other terminal of the source of power, which may be either A.C. or D.C., being connected via conductor 61 to the other side of the aforementioned normally closed portion 49. The manual rotary switch 55 may be comprised of two wafers each having three contacts designated OFF, ON and SYNC. Although it is not essential, the rotary switch 55 should be of a springloaded type to require manual effort to hold it in SYNC position, the portion 54 being closed in the SYNC position only and the portion 62 being closed in ON and SYNC positions only. Further, although the manual control switch 55 is shown in its preferred form as a ganged rotary switch, this is not essential and each portion may comprise a separate conventional switch. For purposes of convenience, the portion 54 of the manual switch 55 connected in series with the normally closed portion 49 of the DPDT switch 48 will be designated the antenna switch, and the portion 62 of the manual switch 55 connected in series with the brightening circuit 63 via conductor 64, as shown most clearly in FIG. 3, will be designated the SHF (ship's heading flasher) switch. Portion 51 of the DPDT switch 48 is connected to ground via conductor 65 and in series with the SHF switch 62 via conductor 66 to permit actuation of the brightening circuit 63, the output signal of which is supplied to the cathode ray tube 22 via conductor 69 in conventional manner. Means to indicate ship heading and/or permit synchronization and coordination of the sweep 27 on the face 23 of the cathode ray tube 22 (see FIG. 2) with antenna position comprises the normally open portion 51 of the DPDT switch 48 connected in series with the SHF switch 62 which in turn is connected in series with a conventional brightening circuit 63. As shown in FIG. 3, contacts ON and SYNC of the SHF switch 62 are tied together. The normally open portion 51 of the DPDT switch 48 is actuated by the antenna 11 when the antenna is in alignment with a desired or predetermined reference direction. When the SHF switch 62 is in either the ON or SYNC position, the brightening circuit 63 is actuated and causes the sweep 27 to become brighter. Rotation of the deflection coil 21 produces the PPI sweep in conventional manner.

As pointed out hereinabove, a portion of the A.C. output from the rotary inverter 10 drives a synchronous motor 16 which may be, for example, a small instrument-type synchronous motor having a rotational speed of 1800 r.p.m. In this case, the gear speed reduction means 18 and 19 may have a ratio of 90:1 to provide a 20 r.p.m. drive for the deflection coil 21 to correspond with that of the antenna 11.

When the radar system is first turned on, which is to say, current is supplied to the rotary inverter 10, the synchronous motor 16 will pull into step with the rotary inverter 10 at some random angular position relative to the position of the antenna 11. Rotation of the manual switch 55 at this time to the SYNC position energizes coil 45 via the normally closed portion 49 of the DPDT switch 48, conductors 61 and 50, the antenna switch 54, conductor 56, and conductor 59. Coil 45 causes arm 47 to move its end portion 46 into a position to engage the stop pin 26 in the deflection coil assembly as it comes into a selected position. When the stop pin 26 is held against rotation by the action of arm 47, the deflection coil 21 is held stationary and gear 19 of the slip clutch slips, allowing the motor 16 and gearing 18 and 19 to continue to turn without undue strain or overloading. At the time the antenna 11 rotates to the predetermined or selected position, such as facing and in alignment with the ship's bow, the normally closed portion 49 of the DPDT switch 48 opens and coil 45 is de-energized. Spring 67 in relay 28 then forces arm 47 to return to its rest position and release the stop pin 26. When the stop pin 26 is released, the deflection coil 21 resumes rotation in synchronism with the antenna 11. As pointed out hereinbefore, the position of relay 28 may be adjusted so that rotation of the deflection coil 21 is stopped in the manner hereinabove described when the sweep is at zero degrees relative bearing. Simultaneously, with the opening of the normally closed portion 49 of the DPDT switch 48, the normally open portion 51 thereof is closed and the SHF switch 62, being in the SYNC or ON position, i.e., closed, the brightening circuit 63 is actuated and sweep 27 is caused to become brighter thereby on the face 23 of the cathode ray tube 22 indicating the ship's heading in azimuth. The ship's heading flasher will now appear at the desired zero degree position indicated by the broken line 68. From the preceding discussion, it may now be obvious that the present invention provides a more simple, dependable, and trouble-free antenna synchronization system that may be manufactured at a substantial reduction in cost over prior art systems. Further, in view of the mechanical aspects of the invention, it may now be obvious that many modifications may be made by those skilled in the art without departing from the spirit and scope of the invention.

While the present invention has been described in its preferred embodiment, it is realized that modifications may be made, and it is desired that it be understood that no limitations on the invention are intended other than may be imposed by the scope of the appended claims.

What is claimed is:

1. In combination: a rotatable antenna member; first means to drive said antenna member; a rotatable deflection member; second means for driving said deflection member; and electrical means for restraining said deflection member overriding the operation of said driving means until a selected position of said deflection member corresponds to a selected position of said antenna member, and means for deactivating said electrical means.

2. In combination: a rotatable antenna member; first means to drive said antenna member at a predetermined rate; a rotatable deflection member; second means for driving said deflection member at said predetermined rate; and electrical means for restraining said deflection member overriding the operation of said driving means until a selected position of said deflection member corresponds to a selected position of said antenna member, and means for deactivating said electrical means.

3. In combination: a rotatable antenna member; first means to drive said antenna member at a predetermined rate; a rotatable deflection member; second means for driving said deflection member at said predetermined rate; and electrical means including a clutch for restraining said deflection member overriding the operation of said driving means until a selected position of said deflection member corresponds to a selected position of said antenna member, and means for deactivating said electrical means.

4. In combination: a rotatable antenna member; first means to drive said antenna member at a predetermined rate; a rotatable deflection member; second means actuated by said first means for driving said deflection member at said predetermined rate; and electrical means including a clutch coupled to said deflection member and said second means for restraining said deflection member overriding the operation of said driving means until a selected position of said deflection member corresponds to a selected position of said antenna member, and means for deactivating said electrical means.

5. In combination: a rotatable antenna member; first means to drive said antenna member at a predetermined rate; a rotatable deflection member; second means in synchronism with said first means for driving said deflection member; clutch means coupling said deflection member and said second means; relay means engageable with said deflection member to stop said deflection member at a selected position notwithstanding the operation of the means for driving said deflection member, means for actuating said relay means to engage said deflection member; and means for deactivating said relay means when a selected position of said antenna member corresponds to said selected position of said deflection member.

6. In combination: a rotatable antenna member; first means to drive said antenna member at a predetermined rate; a rotatable deflection member; second means in synchronism with said first means for driving said deflection member; clutch means coupling said deflection member and said second means; means comprising a relay having an arm engageable with said deflection member to stop said deflection member at a selected position and override the operation of the means for driving said deflection member; means for supplying current to said relay; and means for interrupting said current to said relay when a selected position of said antenna member corresponds to said selected position of said deflection member.

7. In an antenna drive system comprising a rotatable antenna, means for driving said antenna having alternating current output means, display means including a cathode ray tube and deflection means, and means including a synchronous motor connected to said output means for driving said deflection means the improvement comprising: clutch means interposed between said deflection means and said drive means therefor; and means actuated by said antenna for restraining said deflection means overriding the operation of said driving means until a selected position of said deflection means corresponds to a selected position of said antenna.

8. In an antenna drive system comprising a rotatable antenna, means for driving said antenna having alternating current output means, display means including a cathode ray tube and deflection means, and means including a synchronous motor connected to said output means for rotatably driving said deflection means the improvement comprising: clutch means interposed between said deflection means and said drive means therefor; and means actuated by said antenna to stop rotation of said deflection means overriding the operation of said driving means until a selected position of said deflection means corresponds to a selected position of said antenna.

9. In an antenna azimuth drive system comprising a rotatable antenna, means for driving said antenna having alternating current output means, display means including a cathode ray tube and a rotatable deflection coil carried on said tube, and means including a synchronous motor coupled to said output means for rotatably driving said deflection coil the improvement comprising: a clutch interposed between and coupling said deflection coil and said drive means therefor; and means actuated by said antenna for restraining said deflection means overriding the operation of said driving means until a selected position of said deflection coil corresponds to a selected position of said antenna, said last mentioned means including first means engageable with said coil to stop it at said selected position, second means to actuate said first means, and third means to deactuate said first means when the selected position of said coil corresponds to the selected position of said antenna.

10. In an antenna azimuth drive system comprising a rotatable antenna, means for driving said antenna having alternating current output means, display means including a cathode ray tube and a rotatable deflection coil carried on said tube, and means including a synchronous motor coupled to said output means for rotatably driving said deflection coil the improvement comprising: a clutch interposed between and coupling said deflection coil and said drive means therefor; and means actuated by said antenna for restraining said deflection means overriding the operation of said driving means until a selected position of said deflection coil corresponds to a selected position of said antenna, said last mentioned means including a relay having an arm engageable with said coil to stop said coil at said selected position; a first switch connected in series with said relay; and a second normally closed switch connected in series with said first switch and connectable to a source of current for supplying current to said relay, said second switch being actuated when said antenna is in its said selected position.

References Cited in the file of this patent

UNITED STATES PATENTS

| 375,727 | Bridger | Jan. 3, 1888 |
| 2,111,153 | Nichols | Mar. 15, 1938 |
| 2,406,853 | Richardson et al. | Sept. 3, 1946 |

FOREIGN PATENTS

| 577,796 | Great Britain | May 31, 1946 |